United States Patent
Zhang et al.

(10) Patent No.: US 9,445,217 B2
(45) Date of Patent: Sep. 13, 2016

(54) MTC DEVICE COMMUNICATION METHOD, DEVICE, AND SYSTEM

(71) Applicant: Huawei Technologies Co., Ltd., Shenzhen (CN)

(72) Inventors: Lijia Zhang, Beijing (CN); Jing Chen, Shanghai (CN); Yixian Xu, Beijing (CN); Yali Guo, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/518,608

(22) Filed: Oct. 20, 2014

(65) Prior Publication Data

US 2015/0038186 A1 Feb. 5, 2015

Related U.S. Application Data

(63) Continuation of application No. PCT/CN2012/074454, filed on Apr. 20, 2012.

(51) Int. Cl.
*H04B 7/00* (2006.01)
*H04W 4/00* (2009.01)
(Continued)

(52) U.S. Cl.
CPC ............... *H04W 4/005* (2013.01); *H04W 4/14* (2013.01); *H04W 48/14* (2013.01)

(58) Field of Classification Search
CPC ..... H04W 4/005; H04W 4/08; H04W 8/186; H04W 12/06; H04W 36/24; H04W 48/14; H04W 4/14; H04W 60/00; H04W 68/00; H04W 8/04; H04W 8/12; H04W 8/18
USPC .......... 455/509, 411, 435.1, 450, 456.1, 466, 455/515; 370/328, 329, 230, 242
See application file for complete search history.

(56) References Cited

U.S. PATENT DOCUMENTS

2007/0249374 A1 10/2007 Hu et al.
2011/0264914 A1 10/2011 Bae et al.
(Continued)

FOREIGN PATENT DOCUMENTS

CN 101060654 A 10/2007
CN 102056266 A 5/2011
(Continued)

OTHER PUBLICATIONS

"3rd Generation Partnership Project; Technical Specification Group Services and System Aspects; Security aspects of Machine-Type Communications; (Release 11)," 3GPP TR 33.868, V0.6.0, Nov. 2011, 39 pages.
(Continued)

*Primary Examiner* — Shaima Q Aminzay
(74) *Attorney, Agent, or Firm* — Slater Matsil, LLP

(57) ABSTRACT

Embodiments of the present invention provide an MTC device communication method, device, and system. A second network element receives, a query message sent by a first network element after the first network element identifies that a type of a received short message is a preset-type short message. The query message comprises an identifier of a receiver of the short message and an identifier of a sender of the short message. The second network element checks whether the sender is authorized to send the preset-type short message to the receiver. The second network element sends a message to the first network element indicating whether or not to send the short message to the receiver.

9 Claims, 13 Drawing Sheets

(51) Int. Cl.
*H04W 48/14* (2009.01)
*H04W 4/14* (2009.01)

(56) References Cited

U.S. PATENT DOCUMENTS

2011/0292893 A1 12/2011 Lee et al.
2012/0252518 A1* 10/2012 Karampatsis ......... H04W 4/005
                                                                       455/515
2012/0257571 A1* 10/2012 Liao ................... H04W 4/005
                                                                       370/328

FOREIGN PATENT DOCUMENTS

| CN | 102123135 A | 7/2011 |
| CN | 102149190 A | 8/2011 |
| CN | 102158848 A | 8/2011 |
| EP | 2536219 A1 | 12/2012 |

OTHER PUBLICATIONS

"3rd Generation Partnership Project; Technical Specification Group Services and System Aspects; Architecture enhancement to facilitate communications with packet data networks and applications (Release 11)," 3GPP TS 23.682 V11.0. (Mar. 2012), 24 pages.

Huawei et al., "Solutions for Fake SMS Attack From Normal UE," 3GPP TSG SA WG3 (Security) Meeting #66, S3-120110, Feb. 6-10, 2012, 6 pages, Vancouver, Canada.

* cited by examiner

MTC DEVICE COMMUNICATION METHOD, DEVICE, AND SYSTEM

This application is a continuation of International Application No. PCT/CN2012/074454, filed on Apr. 20, 2012, which is hereby incorporated by reference in its entirety.

TECHNICAL FIELD

The present invention relates to communications technologies and, in particular embodiments, to a machine type communication (MTC) device communication method, device, and system.

BACKGROUND

A machine to machine (M2M) communication (referred to as machine communication) technology is also known as a machine type communication (MTC) technology, which integrates radio communications and information technologies and allows a direct communication between machines, requiring no manual intervention. The M2M technology is widely applied to fields, including automatic instruments, remote monitoring, industrial safety and home automation, payment systems, remote vehicle control and the like. A typical characteristic of the MTC technology is that the number of terminals is huge. Generally, a terminal is also known as a user equipment (UE), an MTC device (Device), or a device used for machine type communication (UE used for MTC). In embodiments of the present invention, a terminal is called an MTC device uniformly. An MTC server (Server) may also be known as a services capability server (SCS) and is called the SCS uniformly in the embodiments of the present invention. The SCS can send trigger information to an MTC device by using a short message to trigger the MTC device to establish a communication connection with a network side.

However, an attacker may send trigger information to the MTC device by camouflaging the SCS, controlling the SCS, or controlling a common terminal to trigger the MTC device to establish the communication connection with the network side, thereby decreasing security of triggering the MTC device.

SUMMARY

The present invention provides an MTC device communication method, device, and system to improve security of triggering an MTC device.

In one aspect, an MTC device communication method is provided. A first network element identifies a type of a received short message. The first network element sentence a query message to a second network element if the first network element identifies that the type of the short message is a preset-type short message. The query message includes an identifier of a receiver of the short message and an identifier of a sender of the short message, so that the second network element checks whether the sender is authorized to send the preset-type short message to the receiver. The first network element receives a response message sent by the second network element. The response message includes a check result of the check. According to the check result in the response message, an operation of sending the short message is executed or not. Alternatively, the first network element receives an acknowledgment message or a rejection message that is sent by the second network element according to a check result of the check and executes, according to the acknowledgment message, an operation of sending the short message, or not executing, according to the rejection message, an operation of sending the short message.

In another aspect, an MTC device communication method is provided. A second network element receives a query message sent by a first network element, where the query message is sent after the first network element identifies that a type of a received short message is a preset-type short message, and the query message includes an identifier of a receiver of the short message and an identifier of a sender of the short message. The second network element checks whether the sender is authorized to send the preset-type short message to the receiver. The second network element sentence a response message to the first network element, where the response message includes a check result of the check, so that the first network element executes or does not execute, according to the check result in the response message, an operation of sending the short message, or sentence an acknowledgment message or a rejection message to the first network element according to a check result of the check, so that the first network element executes, according to the acknowledgment message, an operation of sending the short message or does not execute, according to the rejection message, an operation of sending the short message.

In another aspect, a network element includes an identifying unit, configured to identify a type of a received short message. A sending unit is configured to send a query message to a second network element if the identifying unit identifies that the type of the short message is a preset-type short message, where the query message includes an identifier of a receiver of the short message and an identifier of a sender of the short message, so that the second network element checks whether the sender is authorized to send the preset-type short message to the receiver. A processing unit is configured to receive, after the sending unit sends the query message, a response message sent by the second network element, where the response message includes a check result of the check, and execute or not execute, according to the check result in the response message, an operation of sending the short message; or configured to receive, after the sending unit sends the query message, an acknowledgment message or a rejection message that is sent by the second network element according to a check result of the check, and execute, according to the acknowledgment message, an operation of sending the short message, or not execute, according to the rejection message, an operation of sending the short message.

In another aspect, a network element includes a receiving unit, configured to receive a query message sent by a first network element, where the query message is sent after the first network element identifies that a type of a received short message is a preset-type short message, and the query message includes an identifier of a receiver of the short message and an identifier of a sender of the short message. A checking and is configured to check whether the sender of the short message in the query message received by the receiving unit is authorized to send the preset-type short message to the receiver of the short message. A sending unit is configured to send a response message to the first network element, where the response message includes a check result checked by the checking unit, so that the first network element executes or does not execute, according to the check result in the response message, an operation of sending the short message; or send an acknowledgment message or a rejection message to the first network element according to a check result of the check, so that the first network element executes, according to the acknowledgment message, an operation of sending the short message or does not execute, according to the rejection message, an operation of sending the short message.

In another aspect, an MTC device communication system is provided, including the foregoing first network element and the foregoing second network element.

In another aspect, an MTC device communication method includes: receiving, by a first network element, a trigger request, where the trigger request includes trigger information; sending, by the first network element, a query message to a second network element, where the query message includes an identifier of a receiver of the trigger information, an identifier of a sender of the trigger information, and a trigger indication, so that the second network element checks, according to the trigger indication, whether the sender is authorized to send the trigger information to the receiver, where the trigger indication is generated by the first network element according to the trigger request; and receiving, by the first network element, a response message sent by the second network element, where the response message includes a check result of the check, and executing or not executing, according to the check result in the response message, an operation of sending the trigger information; or receiving, by the first network element, an acknowledgment message or a rejection message that is sent by the second network element according to a check result of the check, and executing, according to the acknowledgment message, an operation of sending the trigger information, or not executing, according to the rejection message, an operation of sending the trigger information.

In another aspect, an MTC device communication method includes: receiving, by a second network element, a query message sent by a first network element, where the query message is sent after the first network element receives a trigger request, the trigger request includes trigger information, and the query message includes an identifier of a receiver of the trigger information, an identifier of a sender of the trigger information, and a trigger indication; checking, by the second network element according to the trigger indication, whether the sender is authorized to send the trigger information to the receiver; and sending, by the second network element, a response message to the first network element, where the response message includes a check result of the check, so that the first network element executes or does not execute, according to the check result in the response message, an operation of sending the trigger information; or sending, by the second network element, an acknowledgment message or a rejection message to the first network element according to a check result of the check, so that the first network element executes, according to the acknowledgment message, an operation of sending the short message or does not execute, according to the rejection message, an operation of sending the trigger information.

In another aspect, a network element is provided includes a receiving unit, configured to receive a trigger request, where the trigger request includes trigger information. A sending unit is configured to send a query message to a second network element, where the query message includes an identifier of a receiver of the trigger information received by the receiving unit, an identifier of a sender of the trigger information, and a trigger indication, so that the second network element checks, according to the trigger indication, whether the sender is authorized to send the trigger information to the receiver, where the trigger indication is generated by a first network element according to the trigger request. A processing unit is configured to receive, after the sending unit sends the query message, a response message sent by the second network element, where the response message includes a check result of the check, and execute or not execute, according to the check result in the response message, an operation of sending the trigger information; or configured to receive, after the sending unit sends the query message, an acknowledgment message or a rejection message that is sent by the second network element according to a check result of the check, and execute, according to the acknowledgment message, an operation of sending the trigger information, or not execute, according to the rejection message, an operation of sending the trigger information.

In another aspect, a network element includes a receiving unit, configured to receive a query message sent by a first network element, where the query message is sent after the first network element receives a trigger request, the trigger request includes trigger information, and the query message includes an identifier of a receiver of the trigger information, an identifier of a sender of the trigger information, and a trigger indication. A checking unit is configured to check, according to the trigger indication received by the receiving unit, whether the sender of the trigger information received by the receiving unit is authorized to send the trigger information to the receiver of the trigger information. A sending unit is configured to send a response message to the first network element, where the response message includes a check result checked by the checking unit, so that the first network element executes or does not execute, according to the check result in the response message, an operation of sending the trigger information; or send an acknowledgment message or a rejection message to the first network element according to a check result of the check, so that the first network element executes, according to the acknowledgment message, an operation of sending the trigger information or does not execute, according to the rejection message, an operation of sending the short message.

In another aspect, an MTC device communication system is provided, including the foregoing first network element and the foregoing second network element.

The foregoing technical solutions show that embodiments of the present invention can solve a problem in the prior art that an attacker sends trigger information to an MTC device by camouflaging an SCS, controlling an SCS, or controlling a common terminal, thereby improving security of triggering the MTC device. In addition, the technical solutions of the present invention are used to avoid sending, by an attacker, a false short message or false trigger information to the MTC device, so that the attacker can be prevented from initiating a trigger attack or an information attack, thereby effectively saving electricity consumption of the MTC device and network resources.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show some embodiments of the present invention, and a person of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention can be applied to various radio communications systems, such as: a Global System for Mobile Communications (GSM for short), a General Packet Radio Service (GPRS for short) system, a Code Division Multiple Access (CDMA for short) system, a CDMA2000 system, a Wideband Code Division Multiple Access (WCDMA for short) system, a Long Term Evolution (LTE for short) system, or a Worldwide Interoperability for Microwave Access (WiMAX for short) system.

A first network element may be an MTC interworking function (MTC-IWF for short) device or may also be a device such as a short message service gateway mobile switching center (SMS-GMSC for short). This embodiment poses no limitation thereon.

A second network element may be a home location register (HLR for short) or may also be a device such as a home subscriber server (HSS for short). This embodiment poses no limitation thereon.

A third network element may be a device such as a short message service-service center (SMS-SC for short). This embodiment poses no limitation thereon.

A fourth network element may be a device such as a short message service router (SMS Router for short). This embodiment poses no limitation thereon.

Figure 1:
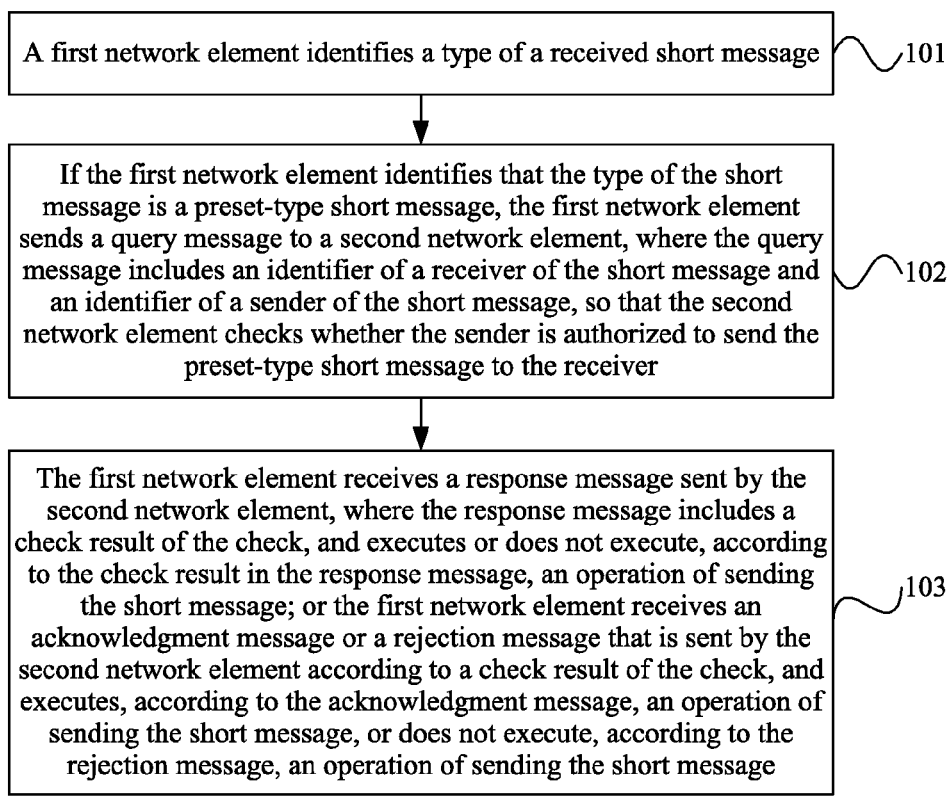
FIG. 1 is a schematic flowchart of an MTC device communication method according to an embodiment of the present invention.

FIG. 1 is a schematic flowchart of an MTC device communication method according to an embodiment of the present invention. As shown in FIG. 1, the MTC device communication method provided by this embodiment may include the following steps.

101: A first network element identifies a type of a received short message.

102: If the first network element identifies that the type of the short message is a preset-type short message, the first network element sends a query message to a second network element, where the query message includes an identifier of a receiver of the short message and an identifier of a sender of the short message, so that the second network element checks (check) whether the sender is authorized to send the preset-type short message to the receiver.

Optionally, the first network element may receive the short message that an SCS actively sends to an MTC device, or may also receive the short message that an attacker sends to an MTC device by controlling an SCS or a common terminal, or may also receive the short message that an attacker sends to an MTC device by camouflaging an SCS. The present invention poses no limitation thereon.

The preset-type short message may include but is not limited to a trigger short message or a small data short message.

103: The first network element receives a response message sent by the second network element, where the response message includes a check result of the check, and executes or does not execute, according to the check result in the response message, an operation of sending the short message; or the first network element receives an acknowledgment message or a rejection message that is sent by the second network element according to a check result of the check, and executes, according to the acknowledgment message, an operation of sending the short message, or does not execute, according to the rejection message, an operation of sending the short message.

Optionally, in an optional implementation manner of this embodiment, the query message and the corresponding response message may be messages in the prior art, for example, a subscriber information request message and a subscriber information response message, or a route information query request (MAP_SRI_FOR_SM) message and a route information query response (MAP_SRI_FOR_SM ack) message, or the like; or may also be new messages. This embodiment poses no limitation thereon.

Optionally, in an optional implementation manner of this embodiment, before 101, the first network element may further receive the short message, where the short message includes preset-type information. For example, the preset-type information may be carried by some information elements (Information Elements, IEs) in a header (Header) or a payload (Payload) of an extended short message, for example, an extended protocol indication TP-Protocol-Identifier. Correspondingly, in 101, the first network element may specifically identify, according to the preset-type information, that the type of the short message is the preset-type short message.

Optionally, in an optional implementation manner of this embodiment, before 101, the first network element may further receive the short message and a first preset-type indication, where the first preset-type indication is sent when a third network element finds that the type of the short message is the preset-type short message. Correspondingly, in 101, the first network element may specifically identify, according to the first preset-type indication, that the type of the short message is the preset-type short message.

It can be understood that a method for the third network element to find that the type of the short message is the preset-type short message is similar to a method for the first network element to identify that the type of the short message is the preset-type short message, and therefore no details are described herein again.

Optionally, in an optional implementation manner of this embodiment, in 102, the query message that the first network element sends to the second network element may further include a second preset-type indication, so that the second network element checks, according to the second preset-type indication, whether the sender is authorized to send the preset-type short message to the receiver.

It can be understood that the second preset-type indication may be an indication that is the same as or different from the first preset-type indication. The present invention poses no limitation thereon. The first preset-type indication and the second preset-type indication may be but are not limited to a trigger indication or a small data indication. The preset-type is just a name. It can be understood as a special type and does not need to be preconfigured on a network or a device.

Optionally, in an optional implementation manner of this embodiment, in 103, if the check result of the check is that the sender is authorized to send the preset-type short message to the receiver, the first network element may execute, according to the check result in the response message, the operation of sending the short message; and if the check result of the check is that the sender is not authorized to send the preset-type short message to the receiver, the first network element may not execute, according to the check result in the response message, the operation of sending the short message.

Optionally, in an optional implementation manner of this embodiment, in 103, if the check result of the check is that the sender is authorized to send the preset-type short message to the receiver, the first network element may receive the acknowledgment message that is sent by the second network element according to the check result of the check; and if the check result of the check is that the sender is not authorized to send the preset-type short message to the receiver, the first network element may receive the rejection message that is sent by the second network element according to the check result of the check. The acknowledgment message may be a query response message that does not include the check result of the check.

In this embodiment, a first network element identifies a type of a received short message. If the first network element identifies that the type of the short message is a preset-type short message, the first network element may send a query message to a second network element, where the query message includes an identifier of a receiver of the short message and an identifier of a sender of the short message, so that the second network element checks whether the sender is authorized to send the preset-type short message to the receiver, it can be realized that only an authorized sender can send the preset-type short message to a corresponding receiver, and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

Figure 2:
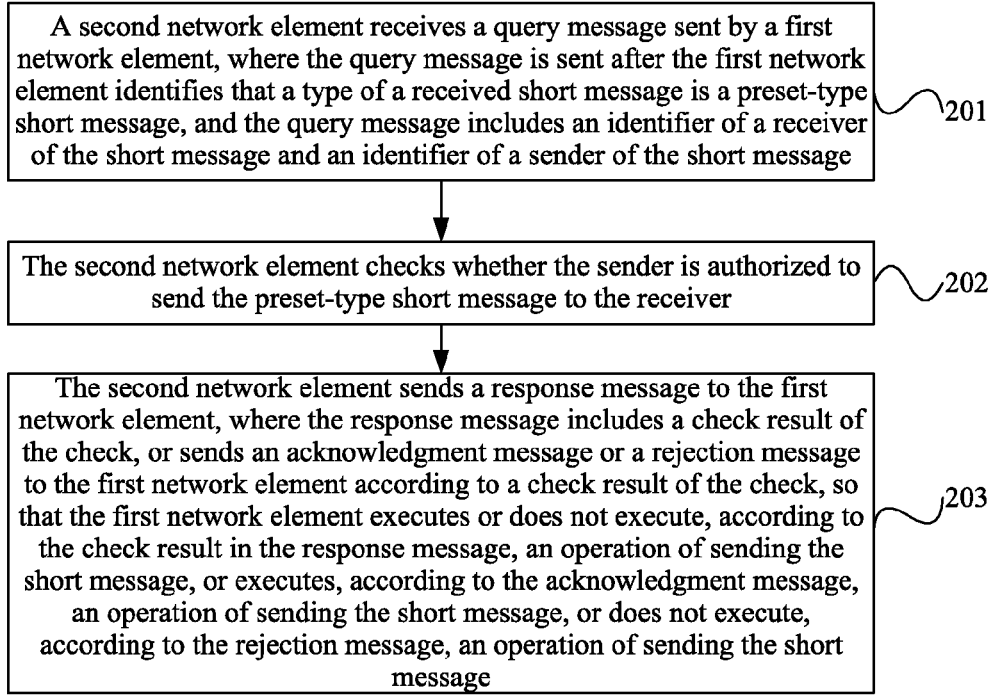
FIG. 2 is a schematic flowchart of an MTC device communication method according to another embodiment of the present invention.

FIG. 2 is a schematic flowchart of an MTC device communication method according to another embodiment of the present invention. As shown in FIG. 2, the MTC device communication method provided by this embodiment may include the following steps.

201: A second network element receives a query message sent by a first network element, where the query message is sent after the first network element identifies that a type of a received short message is a preset-type short message, and the query message includes an identifier of a receiver of the short message and an identifier of a sender of the short message.

The preset-type short message may include but is not limited to a trigger short message or a small data short message.

Optionally, the first network element may receive the short message that an SCS actively sends to an MTC device, or may also receive the short message that an attacker sends to an MTC device by controlling an SCS or a common terminal, or may also receive the short message that an attacker sends to an MTC device by camouflaging an SCS. The present invention poses no limitation thereon.

It should be noted that, for a method for the first network element to identify the type of the received short message, reference may be made to relevant content in the embodiment corresponding to FIG. 1, and details are not described herein again.

202: The second network element checks whether the sender is authorized to send the preset-type short message to the receiver.

203: The second network element sends a response message to the first network element, where the response message includes a check result of the check, or sends an acknowledgment message or a rejection message to the first network element according to a check result of the check, so that the first network element executes or does not execute, according to the check result in the response message, an operation of sending the short message, or executes, according to the acknowledgment message, an operation of sending the short message, or does not execute, according to the rejection message, an operation of sending the short message. The acknowledgment message may be a query response message that does not include the check result.

Optionally, in an optional implementation manner of this embodiment, in 201, the query message received by the second network element may further include a second preset-type indication. Correspondingly, in 202, the second network element may also check, according to the second preset-type indication, whether the sender is authorized to send the preset-type short message to the receiver. The second preset-type indication may be but is not limited to a trigger indication or a small data indication. The preset-type is just a name. It can be understood as a special type and does not need to be preconfigured on a network or a device.

Optionally, in an optional implementation manner of this embodiment, in 202, the second network element may specifically check whether the identifier of the sender is in an authorization list of the receiver. For example, when the identifier of the sender is in the authorization list of the receiver, a check result is that the sender is authorized to send the preset-type short message to the receiver; and when the identifier of the sender is not in the authorization list of the receiver, a check result is that the sender is not authorized to send the preset-type short message to the receiver.

Optionally, in an optional implementation manner of this embodiment, in 203, the second network element may send the response message directly to the first network element; or the second network element may also send the response message to the first network element through a fourth network element.

Optionally, in an optional implementation manner of this embodiment, in 203, the second network element may send the acknowledgment message or the rejection message directly to the first network element according to the check result of the check; or the second network element may also send the acknowledgment message or the rejection message to the first network element through a fourth network element according to the check result of the check. The acknowledgment message may be the query response message that does not include the check result.

In this embodiment, a second network element receives a query message sent by a first network element, where the query message is sent after the first network element identifies that a type of a received short messages is a preset-type short message, and the query message includes an identifier of a receiver of the short message and an identifier of a sender of the short message, and further the second network element checks whether the sender is authorized to send the preset-type short message to the receiver, so that it can be realized that only an authorized sender can send the preset-type short message to a corresponding receiver and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

Figure 3:
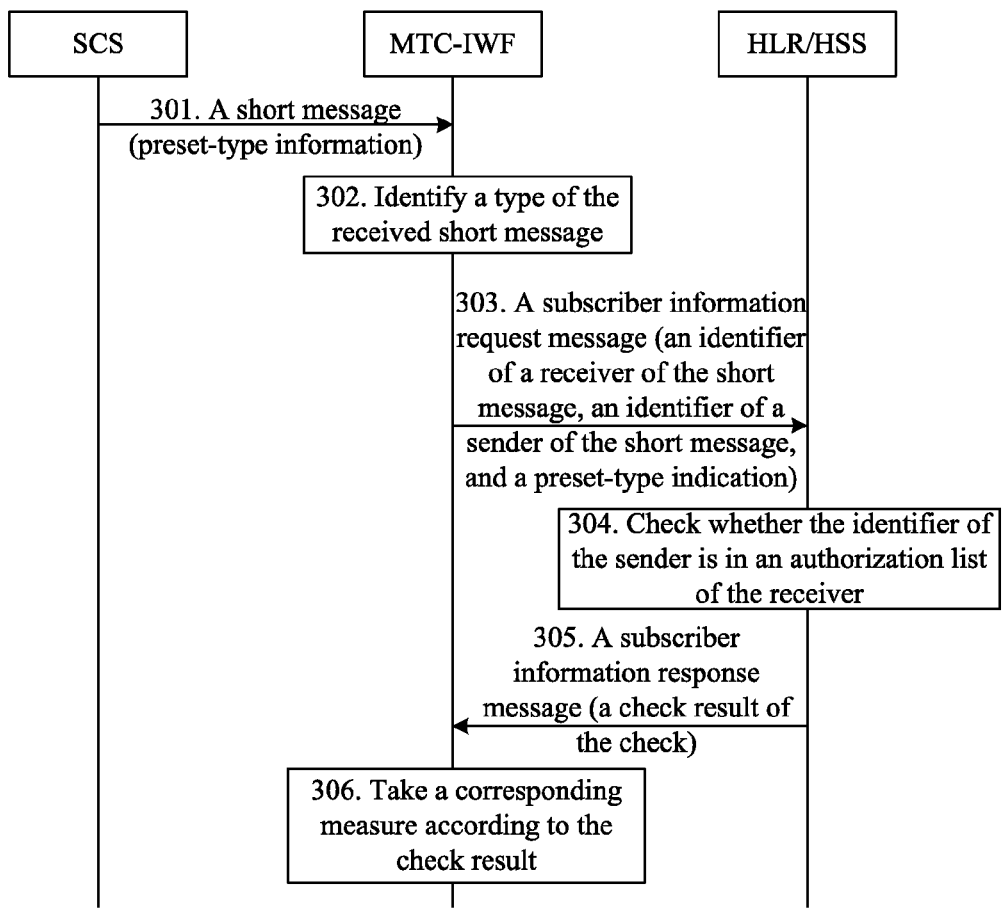
FIG. 3 is a schematic flowchart of an MTC device communication method according to another embodiment of the present invention.
Figure 4:
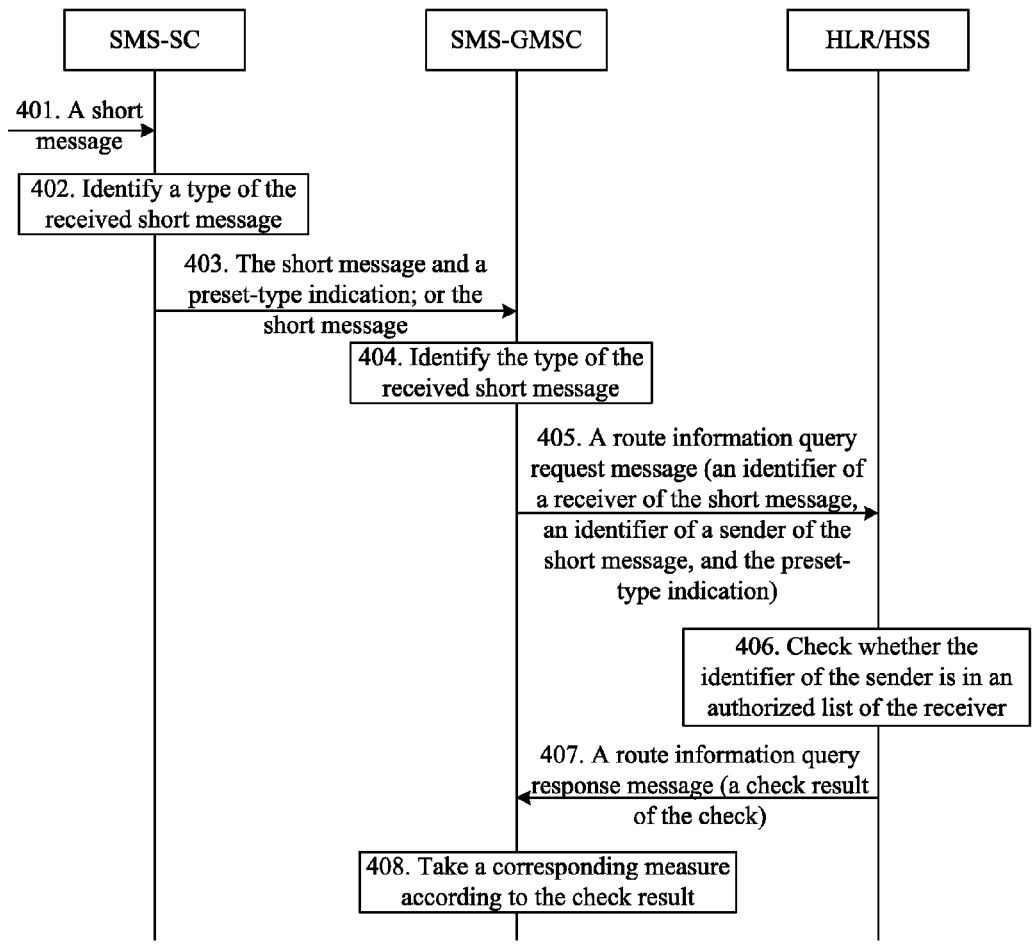
FIG. 4 is a schematic flowchart of an MTC device communication method according to another embodiment of the present invention.
Figure 5:
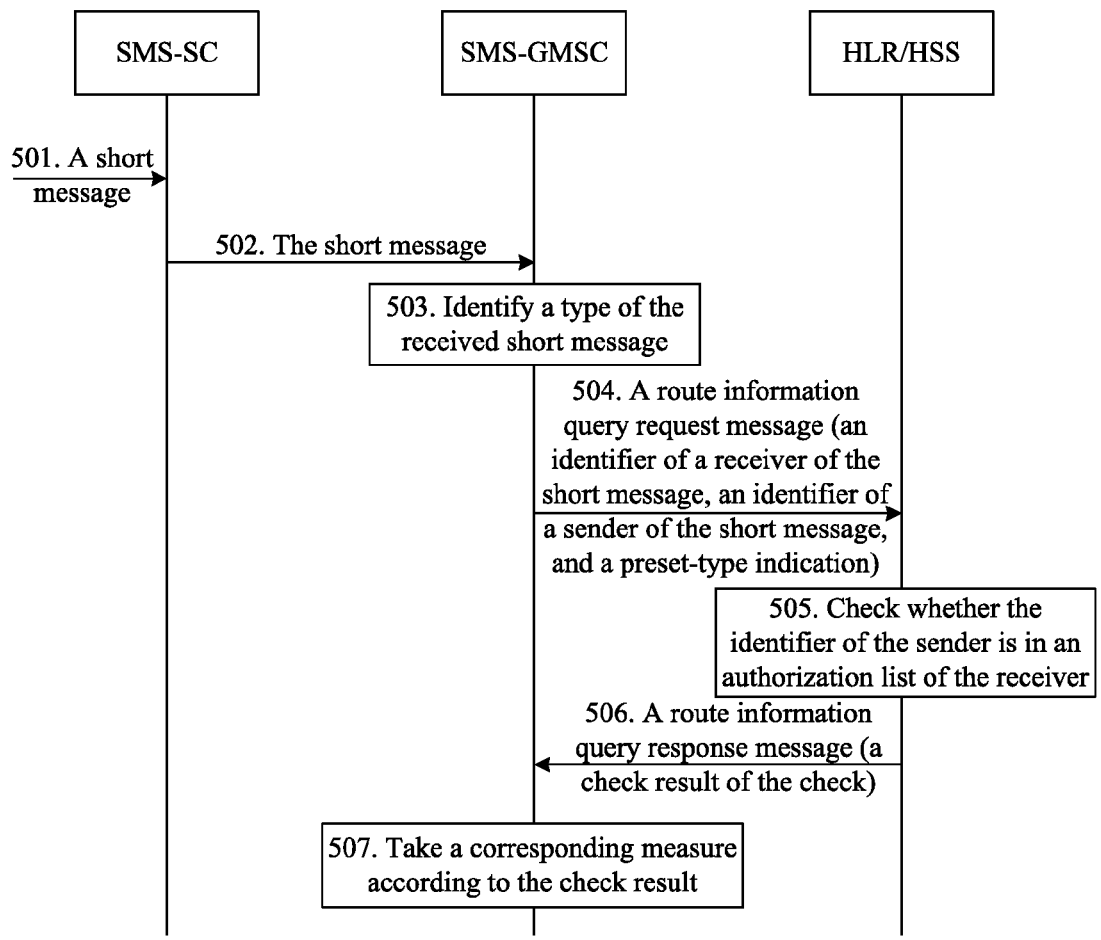
FIG. 5 is a schematic flowchart of an MTC device communication method according to another embodiment of the present invention.

To make the method provided by the embodiment of the present invention clearer, the following uses embodiments corresponding to FIG. 3 to FIG. 5 as examples.

FIG. 3 is a schematic flowchart of an MTC device communication method according to another embodiment of the present invention. In this embodiment, a first network element is an MTC-IWF, and a second network element is an HLR/HSS. As shown in FIG. 3, the MTC device communication method provided by this embodiment may include the following steps.

301: An SCS sends a short message to an MTC-IWF, where the short message includes preset-type information.

302: The MTC-IWF identifies a type of the received short message.

If the short message received by the MTC-IWF includes the preset-type information, the MTC-IWF identifies that the type of the short message is a preset-type short message; and if the short message received by the MTC-IWF does not include the preset-type information, the MTC-IWF identifies that the type of the short message is not a preset-type short message.

The preset-type short message may include but is not limited to a trigger short message or a small data short message.

303: If the MTC-IWF identifies that the type of the short message is a preset-type short message, the MTC-IWF sends a subscriber information request message to an HLR/HSS, where the subscriber information request message includes an identifier of a receiver of the short message, an identifier of a sender of the short message, and a preset-type indication.

The identifier of the receiver of the short message may include but is not limited to an IP address, an international mobile subscriber identity (International Mobile Subscriber Identity, IMSI for short), a mobile station international integrated service digital network (Mobile Station international Integrated Service Digital Network, MSISDN for short) number, or the like of the receiver, and this embodiment poses no limitation thereon. The identifier of the sender of the short message may include but is not limited to an external identifier, an identifier of the SCS, or the like, and this embodiment poses no limitation thereon.

Optionally, the subscriber information request message may not include the preset-type indication. The preset-type indication may be but is not limited to a trigger indication or a small data indication. The preset-type is just a name. It can be understood as a special type and does not need to be preconfigured on a network or a device.

Optionally, if the MTC-IWF identifies that the type of the short message is not the preset-type short message, the MTC-IWF sends a subscriber information request message to the HLR/HSS according to an existing mechanism. For detailed descriptions, reference may be made to relevant content in the prior art, and details are not described herein again.

304: The HLR/HSS checks whether the identifier of the sender is in an authorization list of the receiver.

The HLR/HSS receives the subscriber information request message. If the subscriber information request message includes the preset-type indication, the HLR/HSS may further check whether the identifier of the sender is in the authorization list of the receiver; and if the subscriber information request message does not include the preset-type indication but includes the identifier of the sender, the HLR/HSS may further check whether the identifier of the sender is in the authorization list of the receiver.

It can be understood that, if the subscriber information request message includes neither the preset-type indication nor the identifier of the sender, the HLR/HSS may follow an existing mechanism. For detailed descriptions, reference may be made to relevant content in the prior art, and details are not described herein again.

305: The HLR/HSS sends a subscriber information response message to the MTC-IWF, where the subscriber information response message includes a check result of the check.

It can be understood that the subscriber information response message may also include another information element in the prior art, for example, an identifier of a serving node to which the receiver belongs.

306: The MTC-IWF takes a corresponding measure according to the check result included in the subscriber information response message, that is, executes or does not execute an operation of sending the short message.

If the identifier of the sender is in the authorization list of the receiver, the MTC-IWF continues to send the short message; and if the identifier of the sender is not in the authorization list of the receiver, the MTC-IWF stops sending the short message. Optionally, the MTC-IWF may further send a rejection indication to the SCS.

Optionally, the subscriber information response message may not include the check result of the check. If the identifier of the sender is in the authorization list of the receiver, the HLR/HSS sends an acknowledgment message to the MTC-IWF, and the MTC-IWF continues to send the short message; and if the identifier of the sender is not in the authorization list of the receiver, the HLR/HSS sends a rejection message to the MTC-IWF, and the MTC-IWF stops sending the short message. Optionally, the MTC-IWF may further send a rejection indication to the SCS. The acknowledgment message may be the subscriber information response message that does not include the check result.

In this embodiment, an MTC-IWF identifies a type of a received short message, if the MTC-IWF identifies that the type of the short message is a preset-type short message, a subscriber information request message can be sent to an HLR/HSS, where the subscriber information request message includes an identifier of a receiver of the short message and an identifier of a sender of the short message, so that the HLR/HSS checks whether the sender is authorized to send the preset-type short message to the receiver, it can be realized that only an authorized sender can send the preset-type short message to a corresponding receiver, and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

FIG. 4 is a schematic flowchart of an MTC device communication method according to another embodiment of the present invention. In this embodiment, a first network element is an SMS-GMSC, a second network element is an HLR/HSS, and a third network element is an SMS-SC. As shown in FIG. 4, the MTC device communication method provided by this embodiment may include the following steps.

401: An SMS-SC receives a short message.

402: The SMS-SC identifies a type of the received short message.

If the short message received by the SMS-SC includes preset-type information, the SMS-SC identifies that the type of the short message is a preset-type short message; and if the short message received by the SMS-SC does not include preset-type information, the SMS-SC identifies that the type of the short message is not a preset-type short message.

The preset-type short message may include but is not limited to a trigger short message or a small data short message.

403: If the SMS-SC identifies that the type of the short message is a preset-type short message, the SMS-SC sends the short message and a preset-type indication to an SMS-GMSC; and if the SMS-SC identifies that the type of the short message is not a preset-type short message, the SMS-SC sends the short message to an SMS-GMSC. The preset-type indication may be but is not limited to a trigger indication or a small data indication. The preset-type is just a name. It can be understood as a special type and does not need to be preconfigured on a network or a device.

An identifier of a receiver of the short message may be a destination identifier or a destination address, including but not limited to an IP address, an IMSI, an MSISDN number, or the like of the receiver, and this embodiment poses no limitation thereon. An identifier of a sender of the short message may be a source identifier or a source address, including but not limited to an external identifier, an IP address, an IMSI or an MSISDN number of the sender (for example, a common terminal), the identifier of the sender (for example, an SCS), or the like, and this embodiment poses no limitation thereon.

404: The SMS-GMSC identifies the type of the received short message.

If the SMS-GMSC receives the preset-type indication, or the SMS-GMSC does not receive the preset-type indication, but the received short message includes the preset-type information, the SMS-GMSC identifies that the type of the short message is the preset-type short message; and if the SMS-GMSC does not receive the preset-type indication and the received short message does not include the preset-type information, the SMS-GMSC identifies that the type of the short message is not the preset-type short message.

405: If the SMS-GMSC identifies that the type of the short message is the preset-type short message, the SMS-GMSC sends a route information query request message to an HLR/HSS, where the route information query request message includes the identifier of the receiver of the short message, the identifier of the sender of the short message, and the preset-type indication.

Optionally, the route information query request message may not include the preset-type indication.

Optionally, if the SMS-GMSC identifies that the type of the short message is not the preset-type short message, the SMS-GMSC sends a route information query request message to an HLR/HSS according to an existing mechanism. For detailed descriptions, reference may be made to relevant content in the prior art, and details are not described herein again.

406: The HLR/HSS checks whether the identifier of the sender is in an authorization list of the receiver.

The HLR/HSS receives the route information query request message. If the route information query request message includes the preset-type indication, the HLR/HSS may further check whether the identifier of the sender is in the authorization list of the receiver; and if the route information query request message does not include the preset-type indication but includes the identifier of the sender, the HLR/HSS may further check whether the identifier of the sender is in the authorization list of the receiver.

It can be understood that, if the route information query request message includes neither the preset-type indication nor the identifier of the sender, the HLR/HSS may follow an existing mechanism. For detailed descriptions, reference may be made to relevant content in the prior art, and details are not described herein again.

407: The HLR/HSS sends a route information query response message to the SMS-GMSC, where the route information query response message includes a check result of the check.

It can be understood that the route information query response message may also include another information element in the prior art, for example, an identifier of a serving node to which the receiver belongs.

408: The SMS-GMSC takes a corresponding measure according to the check result included in the route information query response message, that is, executes or does not execute an operation of sending the short message.

If the identifier of the sender is in the authorization list of the receiver, the SMS-GMSC continues to send the short message; and if the identifier of the sender is not in the authorization list of the receiver, the SMS-GMSC stops sending the short message. Optionally, the SMS-GMSC may further send a rejection indication to the SMS-SC.

Optionally, the route information query response message may not include the check result of the check. If the identifier of the sender is in the authorization list of the receiver, the HLR/HSS sends an acknowledgment message to the SMS-GMSC, and the SMS-GMSC continues to send the short message; and if the identifier of the sender is not in the authorization list of the receiver, the HLR/HSS sends a rejection message to the SMS-GMSC, and the SMS-GMSC stops sending the short message. Optionally, the SMS-GMSC may further send a rejection indication to the SMS-SC. The acknowledgment message may be the route information query response message that does not include the check result.

Optionally, a process for the SMS-GMSC to send the received short message may further involve an SMS Router. For example, after receiving the route information query request message that is sent by the SMS-GMSC and includes the identifier of the receiver of the short message, the identifier of the sender of the short message, and the preset-type indication, the HLR/HSS sends, to the SMS Router, the route information query request message including the identifier of the receiver of the short message, the identifier of the sender of the short message, and the preset-type indication, and the HLR/HSS receives a route information query request message that is returned by the SMS Router and includes the identifier of the receiver of the short message, the identifier of the sender of the short message, and the preset-type indication. Then, the HLR/HSS checks whether the identifier of the sender is in the authorization list of the receiver and sends the route information query response message including the check result of the check to the SMS Router. The SMS Router then sends the route information query response message including the check result of the check to the SMS-GMSC. It can be understood that, for message exchange between the HLR/HSS and the SMS-GMSC through the SMS Router, reference may be made to relevant content in the prior art, and details are not described herein again.

In this embodiment, an SMS-GMSC identifies, according to a received short message or a received preset-type indication, a type of the short message, if the SMS-GMSC identifies that the type of the short message is a preset-type short message, a route information query request message may be sent to an HLR/HSS, where the route information query request message includes an identifier of a receiver of the short message and an identifier of a sender of the short message, so that the HLR/HSS checks whether the sender is authorized to send the preset-type short message to the receiver, it can be realized that only an authorized sender can send the preset-type short message to a corresponding receiver, and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

FIG. 5 is a schematic flowchart of an MTC device communication method according to another embodiment of the present invention. In this embodiment, a first network element is an SMS-GMSC, and a second network element is an HLR/HSS. As shown in FIG. 5, the MTC device communication method provided by this embodiment may include the following steps.

501: An SMS-SC receives a short message.

502: The SMS-SC sends the short message to an SMS-GMSC.

503: The SMS-GMSC identifies a type of the received short message.

If the short message received by the SMS-GMSC includes preset-type information, the SMS-GMSC identifies that the type of the short message is a preset-type short message; and if the short message received by the SMS-GMSC does not include preset-type information, the SMS-GMSC identifies that the type of the short message is not a preset-type short message.

The preset-type short message may include but is not limited to a trigger short message or a small data short message.

504: If the SMS-GMSC identifies that the type of the short message is a preset-type short message, the SMS-GMSC sends a route information query request message to an HLR/HSS, where the route information query request message includes an identifier of a receiver of the short message, an identifier of a sender of the short message, and a preset-type indication. The preset-type indication may be but is not limited to a trigger indication or a small data indication. The preset-type is just a name. It can be understood as a special type and does not need to be preconfigured on a network or a device.

The identifier of the receiver of the short message may be a destination identifier or a destination address, including but not limited to an IP address, an IMSI, an MSISDN number, or the like of the receiver, and this embodiment poses no limitation thereon. The identifier of the sender of the short message may be a source identifier or a source address, including but not limited to an external identifier, an IP address, an IMSI or an MSISDN number of the sender (for example, a common terminal), the identifier of the sender (for example, an SCS), or the like, and this embodiment poses no limitation thereon.

Optionally, the route information query request message may not include the preset-type indication.

Optionally, if the SMS-GMSC identifies that the type of the short message is not the preset-type short message, the SMS-GMSC sends a route information query request message to an HLR/HSS according to an existing mechanism. For detailed descriptions, reference may be made to relevant content in the prior art, and details are not described herein again.

505: The HLR/HSS checks whether the identifier of the sender is in an authorization list of the receiver.

The HLR/HSS receives the route information query request message. If the route information query request message includes the preset-type indication, the HLR/HSS can further check whether the identifier of the sender is in the authorization list of the receiver; and if the route information query request message does not include the preset-type indication but includes the identifier of the sender, the HLR/HSS can further check whether the identifier of the sender is in the authorization list of the receiver.

It can be understood that, if the route information query request message includes neither the preset-type indication nor the identifier of the sender, the HLR/HSS may follow an existing mechanism. For detailed descriptions, reference may be made to relevant content in the prior art, and details are not described herein again.

506: The HLR/HSS sends a route information query response message to the SMS-GMSC, where the route information query response message includes a check result of the check.

It can be understood that the route information query response message may also include another information element in the prior art, for example, an identifier of a serving node to which the receiver belongs.

507: The SMS-GMSC takes a corresponding measure according to the check result included in the route information query response message, that is, executes or does not execute an operation of sending the short message.

If the identifier of the sender is in the authorization list of the receiver, the SMS-GMSC continues to send the short message; and if the identifier of the sender is not in the authorization list of the receiver, the SMS-GMSC stops sending the short message. Optionally, the SMS-GMSC may further send a rejection indication to the SMS-SC.

Optionally, the route information query response message may not include the check result of the check. If the identifier of the sender is in the authorization list of the receiver, the HLR/HSS sends an acknowledgment message to the SMS-GMSC and the SMS-GMSC continues to send the short message; and if the identifier of the sender is not in the authorization list of the receiver, the HLR/HSS sends a rejection message to the SMS-GMSC and the SMS-GMSC stops sending the short message. Optionally, the SMS-GMSC may further send a rejection indication to the SMS-SC. The acknowledgment message may be the route information query response message that does not include the check result.

Optionally, a process for the SMS-GMSC to send the received short message may further involve an SMS Router. For example, after receiving the route information query request message that is sent by the SMS-GMSC and includes the identifier of the receiver of the short message, the identifier of the sender of the short message, and the preset-type indication, the HLR/HSS sends, to the SMS Router, the route information query request message including the identifier of the receiver of the short message, the identifier of the sender of the short message, and the preset-type indication, and the HLR/HSS receives a route information query request message that is returned by the SMS Router and includes the identifier of the receiver of the short message, the identifier of the sender of the short message, and the preset-type indication. Then, the HLR/HSS checks whether the identifier of the sender is in the authorization list of the receiver and sends the route information query response message including the check result of the check to the SMS Router. The SMS Router then sends the route information query response message including the check result of the check to the SMS-GMSC. It can be understood that, for message exchange between the HLR/HSS and the SMS-GMSC through the SMS Router, reference may be made to relevant content in the prior art, and details are not described herein again.

In this embodiment, an SMS-GMSC identifies, according to a received short message, a type of the short message. If the SMS-GMSC identifies that the type of the short message is a preset-type short message, it may send a route information query request message to an HLR/HSS, where the route information query request message includes an identifier of a receiver of the short message and an identifier of a sender of the short message, so that the HLR/HSS checks whether the sender is authorized to send the preset-type short message to the receiver, it can be realized that only an authorized sender can send the preset-type short message to a corresponding receiver, and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

Figure 6:
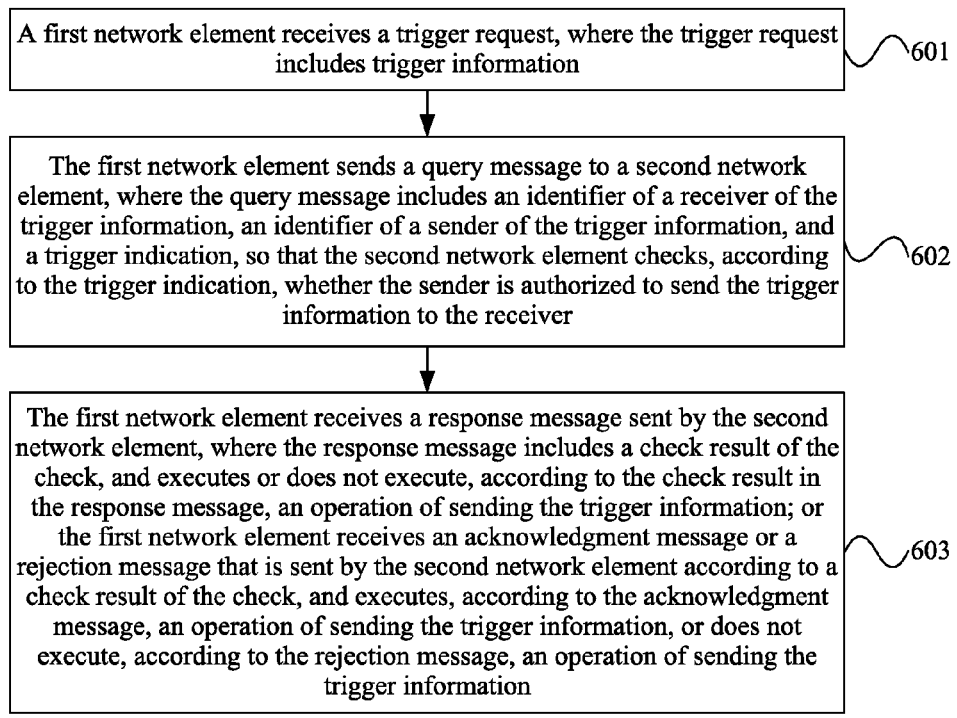
FIG. 6 is a schematic flowchart of an MTC device communication method according to another embodiment of the present invention.

FIG. 6 is a schematic flowchart of an MTC device communication method according to another embodiment of the present invention. As shown in FIG. 6, the MTC device communication method provided by this embodiment may include the following steps.

601: A first network element receives a trigger request, where the trigger request includes trigger information.

The trigger information is used to trigger an MTC device to establish a communication connection with a network side. For detailed descriptions, reference may be made to relevant content in the prior art, and details are not described herein again.

Optionally, the first network element may receive the trigger information that an SCS actively sends to the MTC device, or may also receive the trigger information that an attacker sends to the MTC device by controlling an SCS or a common terminal, or may also receive the trigger information that an attacker sends to the MTC device by camouflaging an SCS. The present invention poses no limitation thereon.

602: The first network element sends a query message to a second network element, where the query message includes an identifier of a receiver of the trigger information, an identifier of a sender of the trigger information, and a trigger indication, so that the second network element checks, according to the trigger indication, whether the sender is authorized to send the trigger information to the receiver, where the trigger indication is generated by the first network element according to the trigger request.

Optionally, in an optional implementation manner of this embodiment, the query message and a corresponding response message may be messages in the prior art, for example, a subscriber information request message and a subscriber information response message; or may also be new messages. This embodiment poses no limitation thereon.

603: The first network element receives a response message sent by the second network element, where the response message includes a check result of the check, and executes or does not execute, according to the check result in the response message, an operation of sending the trigger information; or the first network element receives an acknowledgment message or a rejection message that is sent by the second network element according to a check result of the check, and executes, according to the acknowledgment message, an operation of sending the trigger information, or does not execute, according to the rejection message, an operation of sending the trigger information.

Optionally, in an optional implementation manner of this embodiment, in 603, if the check result of the check is that the sender is authorized to send the trigger information to the receiver, the first network element may execute, according to the check result in the response message, the operation of sending the trigger information; and if the check result of the check is that the sender is not authorized to send the trigger information to the receiver, the first network element does not execute, according to the check result in the response message, the operation of sending the trigger information.

Optionally, in an optional implementation manner of this embodiment, in 603, if the check result of the check is that the sender is authorized to send the trigger information to the receiver, the first network element may receive the acknowledgment message that is sent by the second network element according to the check result of the check; and if the check result of the check is that the sender is not authorized to send the trigger information to the receiver, the first network element may receive the rejection message that is sent by the second network element according to the check result of the check.

In this embodiment, after receiving a trigger request including trigger information, a first network element sends a query message to a second network element, where the query message includes an identifier of a receiver of the trigger information, an identifier of a sender of the trigger information, and a trigger indication, so that the second network element checks, according to the trigger indication, whether the sender is authorized to send the trigger information to the receiver, it can be realized that only an authorized sender can send the trigger information to a corresponding receiver, and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 7:
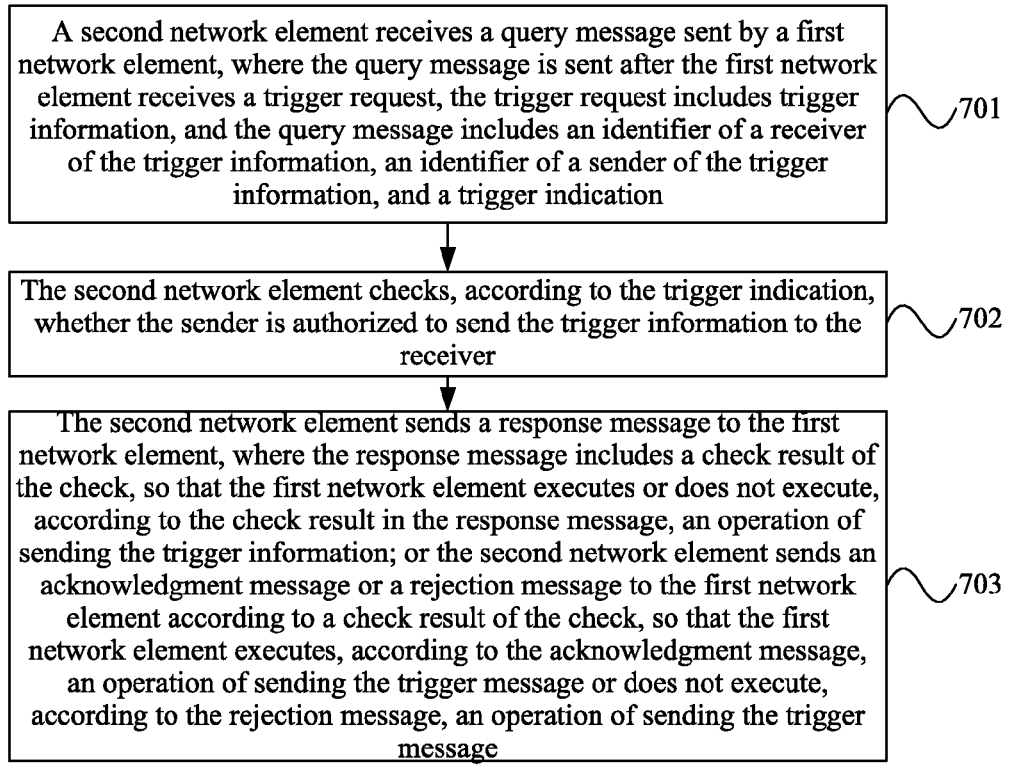
FIG. 7 is a schematic flowchart of an MTC device communication method according to another embodiment of the present invention.

FIG. 7 is a schematic flowchart of an MTC device communication method according to another embodiment of the present invention. As shown in FIG. 7, the MTC device communication method provided by this embodiment may include the following steps.

701: A second network element receives a query message sent by a first network element, where the query message is sent after the first network element receives a trigger request, the trigger request includes trigger information, and the query message includes an identifier of a receiver of the trigger information, an identifier of a sender of the trigger information, and a trigger indication.

The trigger information is used to trigger an MTC device to establish a communication connection with a network side. For detailed descriptions, reference may be made to relevant content in the prior art, and details are not described herein again.

702: The second network element checks, according to the trigger indication, whether the sender is authorized to send the trigger information to the receiver.

703: The second network element sends a response message to the first network element, where the response message includes a check result of the check, so that the first network element executes or does not execute, according to the check result in the response message, an operation of sending the trigger information; or the second network element sends an acknowledgment message or a rejection message to the first network element according to a check result of the check, so that the first network element executes, according to the acknowledgment message, an operation of sending the trigger message or does not execute, according to the rejection message, an operation of sending the trigger information.

Optionally, in an optional implementation manner of this embodiment, in 702, the second network element may specifically check, according to the trigger indication, whether the identifier of the sender is in an authorization list of the receiver. For example, when the identifier of the sender is in the authorization list of the receiver, a check result is that the sender is authorized to send the trigger information to the receiver; and when the identifier of the sender is not in the authorization list of the receiver, a check result is that the sender is not authorized to send the trigger information to the receiver.

In this embodiment, a second network element receives a query message sent by a first network element, where the query message is sent after the first network element receives a trigger request, and the query message includes an identifier of a receiver of the trigger information, an identifier of a sender of the trigger information, and a trigger indication, and further the second network element checks, according to the trigger indication, whether the sender is authorized to send the trigger information to the receiver, so that it can be realized that only an authorized sender can send the trigger information to a corresponding receiver and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 8:
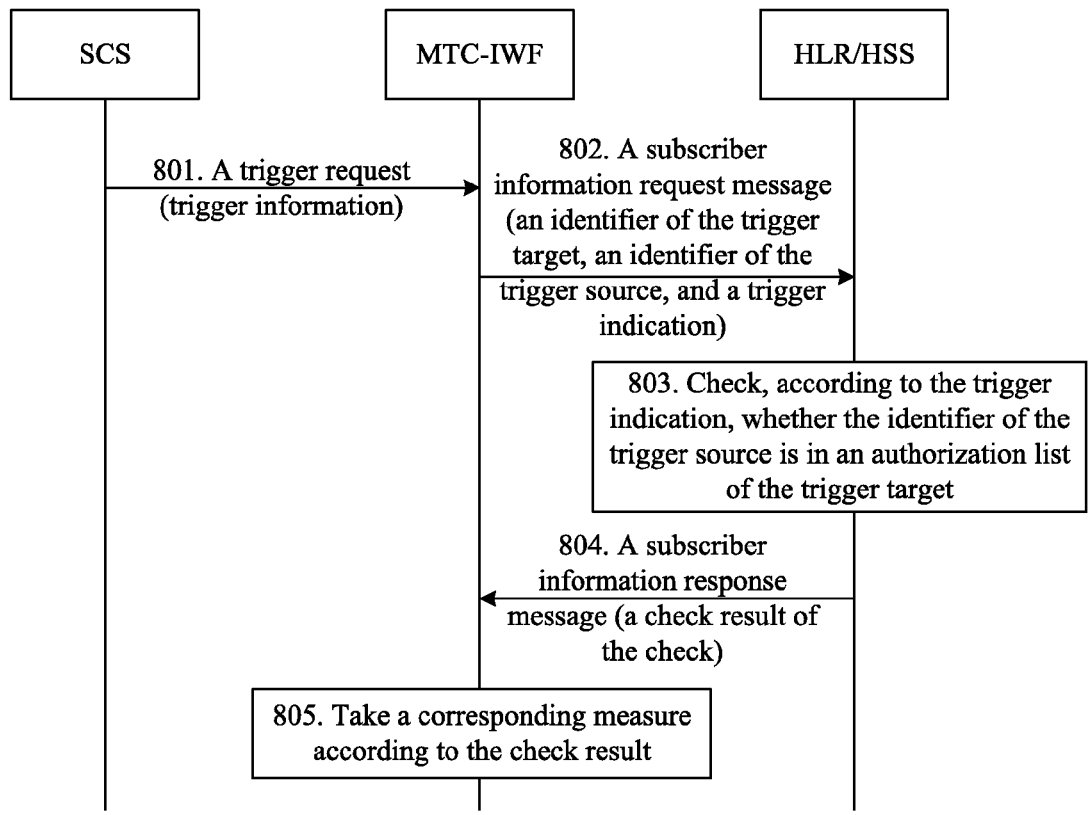
FIG. 8 is a schematic flowchart of an MTC device communication method according to another embodiment of the present invention.

To make the method provided by the embodiment of the present invention clearer, the following uses an embodiment corresponding to FIG. 8 as an example.

FIG. 8 is a schematic flowchart of an MTC device communication method according to another embodiment of the present invention. As shown in FIG. 8, the MTC device communication method provided by this embodiment may include the following steps.

801: An SCS sends a trigger request to an MTC-IWF, where the trigger request includes trigger information.

The trigger information is used to trigger an MTC device to establish a communication connection with a network side. For detailed descriptions, reference may be made to relevant content in the prior art, and details are not described herein again.

802: The MTC-IWF sends a subscriber information request message to an HLR/HSS, where the subscriber information request message includes an identifier of a receiver (that is, a trigger target) of the trigger information, an identifier of a sender (that is, a trigger source) of the trigger information, and a trigger indication.

The trigger indication is generated by the MTC-IWF according to the trigger request. The identifier of the trigger target may include but is not limited to an IP address, an international mobile subscriber identity (International Mobile Subscriber Identity, IMSI for short), a mobile station international integrated service digital network (Mobile Station international Integrated Service Digital Network, MSISDN for short) number, or the like of the receiver, and this embodiment poses no limitation thereon. The identifier of the trigger source may include but is not limited to an external identifier, an identifier of the SCS, or the like, and this embodiment poses no limitation thereon.

Optionally, the subscriber information request message may not include the trigger indication.

803: The HLR/HSS checks, according to the trigger indication, whether the identifier of the trigger source is in an authorization list of the trigger target.

The HLR/HSS receives the subscriber information request message. If the subscriber information request message includes the trigger indication, the HLR/HSS may further check whether the identifier of the trigger source is in the authorization list of the trigger target.

804: The HLR/HSS sends a subscriber information response message to the MTC-IWF, where the subscriber information response message includes a check result of the check.

It can be understood that the subscriber information response message may also include another information element in the prior art, for example, an identifier of a serving node to which the receiver belongs.

805: The MTC-IWF takes a corresponding measure according to the check result included in the subscriber information response message, that is, executes or does not execute an operation of sending the trigger information.

If the identifier of the trigger source is in the authorization list of the trigger target, the MTC-IWF continues to send the trigger information; and if the identifier of the trigger source is not in the authorization list of the trigger target, the MTC-IWF stops sending the trigger information. Optionally, the MTC-IWF may further send a rejection indication to the SCS.

Optionally, the subscriber information response message may not include the check result of the check. If the identifier of the trigger source is in the authorization list of the trigger target, the HLR/HSS sends an acknowledgment message to the MTC-IWF and the MTC-IWF continues to send the trigger information; and if the identifier of the trigger source is not in the authorization list of the trigger target, the HLR/HSS sends a rejection message to the MTC-IWF and the MTC-IWF stops sending the trigger information. Optionally, the MTC-IWF may further send a rejection indication to the SCS.

In this embodiment, an MTC-IWF sends a subscriber information request message to an HLR/HSS, where the subscriber information request message includes an identifier of a trigger source, an identifier of a trigger target, and a trigger indication, so that the HLR/HSS checks, according to the trigger indication, whether the trigger source is authorized to send trigger information to the trigger target, it can be realized that only an authorized trigger source can send the trigger information to a corresponding trigger target, and a problem in the prior art that an attacker sends the trigger information to an MTC device by camouflaging an SCS, controlling an SCS, or controlling a common terminal/a terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 15:
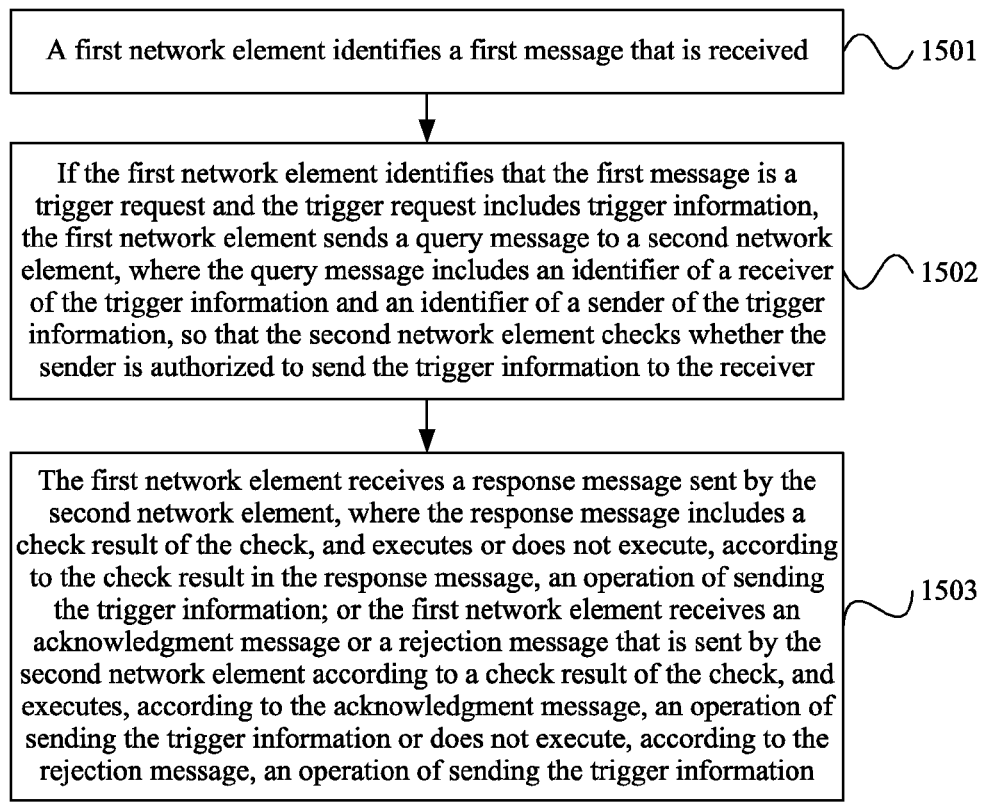
FIG. 15 is a schematic flowchart of an MTC device communication method according to another embodiment of the present invention.

FIG. 15 is a schematic flowchart of an MTC device communication method according to another embodiment of the present invention. As shown in FIG. 15, the MTC device communication method provided by this embodiment may include the following steps.

1501: A first network element identifies a first message that is received.

1502: If the first network element identifies that the first message is a trigger request and the trigger request includes trigger information, the first network element sends a query message to a second network element, where the query message includes an identifier of a receiver of the trigger information and an identifier of a sender of the trigger information, so that the second network element checks whether the sender is authorized to send the trigger information to the receiver.

1503: The first network element receives a response message sent by the second network element, where the response message includes a check result of the check, and executes or does not execute, according to the check result in the response message, an operation of sending the trigger information; or the first network element receives an acknowledgment message or a rejection message that is sent by the second network element according to a check result of the check, and executes, according to the acknowledgment message, an operation of sending the trigger information, or does not execute, according to the rejection message, an operation of sending the trigger information.

Optionally, in an optional implementation manner of this embodiment, in 1503, if the check result of the check is that the sender is authorized to send the trigger information to the receiver, the first network element executes, according to the check result in the response message, the operation of sending the trigger information; and if the check result of the check is that the sender is not authorized to send the trigger information to the receiver, the first network element does not execute, according to the check result in the response message, the operation of sending the trigger information.

Optionally, in an optional implementation manner of this embodiment, in 1503, if the check result of the check is that the sender is authorized to send the trigger information to the receiver, the first network element receives the acknowledgment message that is sent by the second network element according to the check result of the check; and if the check result of the check is that the sender is not authorized to send the trigger information to the receiver, the first network element receives the rejection message that is sent by the second network element according to the check result of the check.

Optionally, in an optional implementation manner of this embodiment, after 1501, if the first network element identifies that the first message is not a trigger request, the first network element sends a query message to a second network element, where the query message includes an identifier of a receiver of the trigger information.

In this embodiment, a first network element identifies a first message that is received, and if the first network element identifies that the first message is a trigger request, the first network element sends a query message to a second network element, where the query message includes an identifier of a receiver of the trigger information and an identifier of a sender of the trigger information, so that the second network element checks whether the sender is authorized to send the trigger information to the receiver, it can be realized that only an authorized sender can send the trigger information to a corresponding receiver, and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 16:
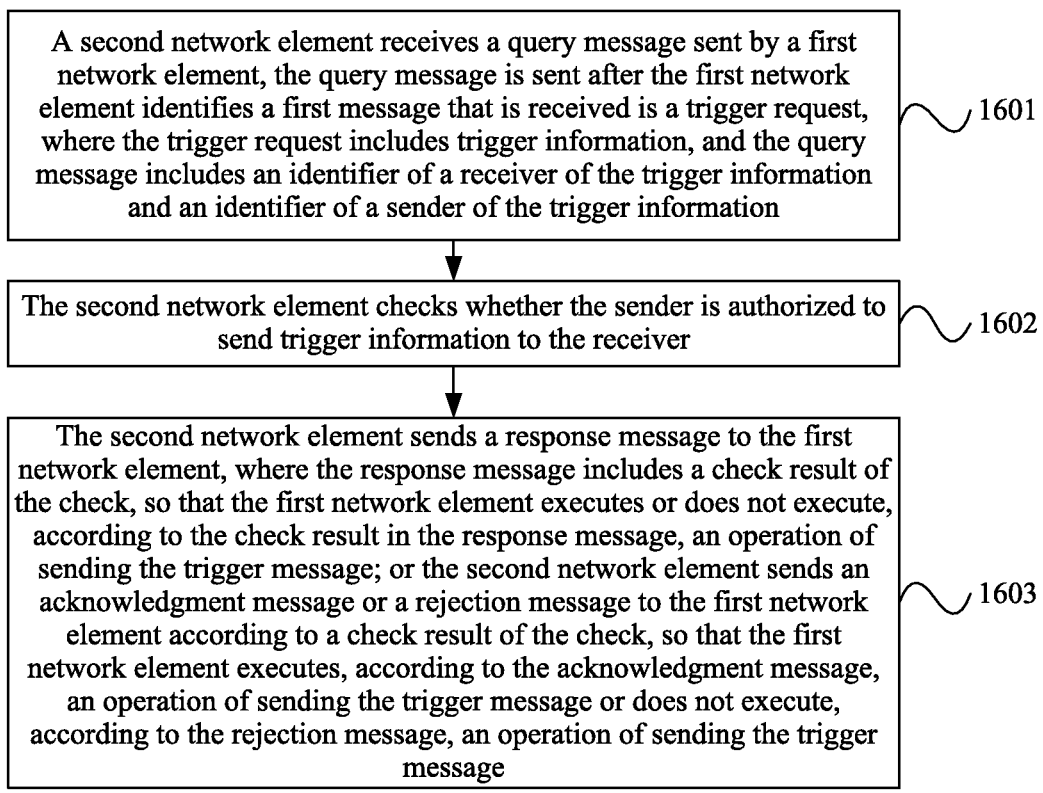
FIG. 16 is a schematic flowchart of an MTC device communication method according to another embodiment of the present invention.

FIG. 16 is a schematic flowchart of an MTC device communication method according to another embodiment of the present invention. As shown in FIG. 16, the MTC device communication method provided by this embodiment may include the following steps.

1601: A second network element receives a query message sent by a first network element, where the query message is sent after the first network element identifies a first message that is received is a trigger request, the trigger request includes trigger information, and the query message includes an identifier of a receiver of the trigger information and an identifier of a sender of the trigger information.

1602: The second network element checks whether the sender is authorized to send the trigger information to the receiver.

1603: The second network element sends a response message to the first network element, where the response message includes a check result of the check, so that the first network element executes or does not execute, according to the check result in the response message, an operation of sending the trigger information; or the second network element sends an acknowledgment message or a rejection message to the first network element according to a check result of the check, so that the first network element executes, according to the acknowledgment message, an operation of sending the trigger message or does not execute, according to the rejection message, an operation of sending the trigger information.

Optionally, in an optional implementation manner of this embodiment, in 1602, the second network element may specifically check whether the identifier of the sender is in an authorization list of the receiver. For example, when the identifier of the sender is in the authorization list of the receiver, a check result is that the sender is authorized to send the trigger information to the receiver; and when the identifier of the sender is not in the authorization list of the receiver, a check result is that the sender is not authorized to send the trigger information to the receiver.

In this embodiment, a second network element receives a query message sent by a first network element, where the query message is a first message identified and received by the first network element and is sent if the first network element identifies that the first message is a trigger request, and the query message includes an identifier of a receiver of the trigger information and an identifier of a sender of the trigger information, and further the second network element checks whether the sender is authorized to send the trigger information to the receiver, so that it can be realized that only an authorized sender can send the trigger information to a corresponding receiver and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 17:
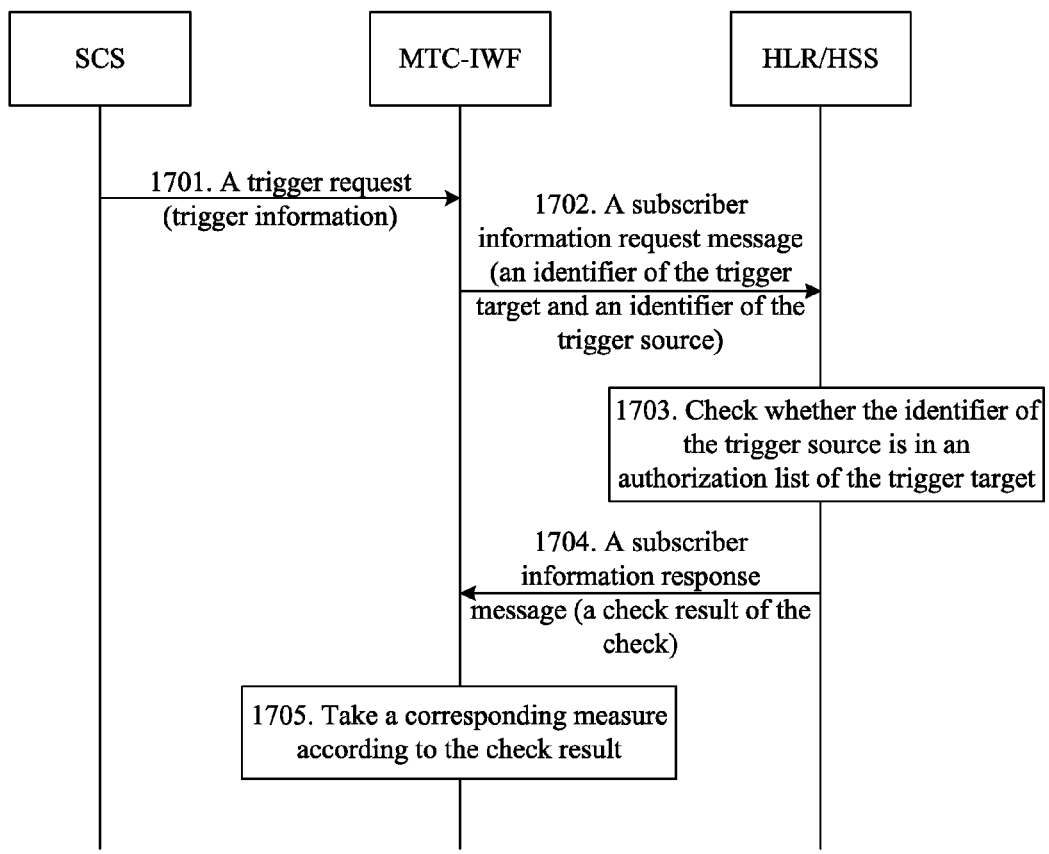
FIG. 17 is a schematic flowchart of an MTC device communication method according to another embodiment of the present invention.

To make the method provided by the embodiment of the present invention clearer, the following uses an embodiment corresponding to FIG. 17 as an example.

FIG. 17 is a schematic flowchart of an MTC device communication method according to another embodiment of the present invention. As shown in FIG. 17, the MTC device communication method provided by this embodiment may include the following steps.

1701: An SCS sends a trigger request to an MTC-IWF, where the trigger request includes trigger information.

The trigger information is used to trigger an MTC device to establish a communication connection with a network side. For detailed descriptions, reference may be made to relevant content in the prior art, and details are not described herein again.

1702: The MTC-IWF identifies that a received message is the trigger request and sends a subscriber information request message to an HLR/HSS, where the subscriber information request message includes an identifier of a receiver (that is, a trigger target) of the trigger information and an identifier of a sender (that is, a trigger source) of the trigger information.

The identifier of the trigger target may include but is not limited to an IP address, an international mobile subscriber identity (International Mobile Subscriber Identity, IMSI for short), a mobile station international integrated service digital network (Mobile Station international Integrated Service Digital Network, MSISDN for short) number, or the like of the receiver, and this embodiment poses no limitation thereon. The identifier of the trigger source may include but is not limited to an external identifier, an identifier of the SCS, or the like, and this embodiment poses no limitation thereon.

1703: The HLR/HSS checks whether the identifier of the trigger source is in an authorization list of the trigger target.

The HLR/HSS receives the subscriber information request message. If the subscriber information request message includes a trigger indication, the HLR/HSS may further check whether the identifier of the trigger source is in the authorization list of the trigger target.

1704: The HLR/HSS sends a subscriber information response message to the MTC-IWF, where the subscriber information response message includes a check result of the check.

It can be understood that the subscriber information response message may also include another information element in the prior art, for example, an identifier of a serving node to which the receiver belongs.

1705: The MTC-IWF takes a corresponding measure according to the check result included in the subscriber information response message, that is, executes or does not execute an operation of sending the trigger information.

If the identifier of the trigger source is in the authorization list of the trigger target, the MTC-IWF continues to send the trigger information; and if the identifier of the trigger source is not in the authorization list of the trigger target, the MTC-IWF stops sending the trigger information. Optionally, the MTC-IWF may further send a rejection indication to the SCS.

Optionally, the subscriber information response message may not include the check result of the check. If the identifier of the trigger source is in the authorization list of the trigger target, the HLR/HSS sends an acknowledgment message to the MTC-IWF and the MTC-IWF continues to send the trigger information; and if the identifier of the trigger source is not in the authorization list of the trigger target, the HLR/HSS sends a rejection message to the MTC-IWF and the MTC-IWF stops sending the trigger information. Optionally, the MTC-IWF may further send a rejection indication to the SCS.

In this embodiment, if an MTC-IWF identifies that a received message is a trigger request, the MTC-IWF sends a subscriber information request message to an HLR/HSS, where the subscriber information request message includes an identifier of a trigger source and an identifier of a trigger target, so that the HLR/HSS checks whether the trigger source is authorized to send trigger information to the trigger target, it can be realized that only an authorized trigger source can send the trigger information to a corresponding trigger target, and a problem in the prior art that an attacker sends the trigger information to an MTC device by camouflaging an SCS, controlling an SCS, or controlling a common terminal/a terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

It should be noted that, for ease of description, the foregoing method embodiments are represented as a series of action combinations, but a person skilled in the art should know that the present invention is not limited to the described action orders because according to the present invention, some steps may be performed in another order or concurrently. Next, a person skilled in the art should also know that the embodiments described in this specification are exemplary embodiments and the involved actions and modules are not necessarily mandatory for the present invention.

In the foregoing embodiments, the embodiments are described differently in terms of key points. For a part that is not described in detail in an embodiment, reference may be made to relevant descriptions in other embodiments.

Figure 9:
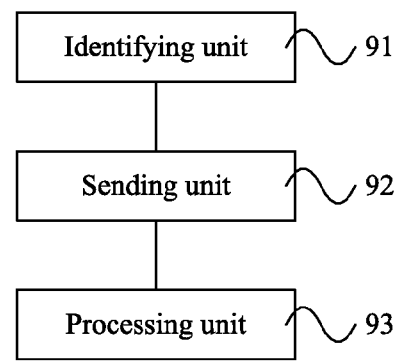
FIG. 9 is a schematic structural diagram of a network element according to another embodiment of the present invention.

FIG. 9 is a schematic structural diagram of a network element according to another embodiment of the present invention. As shown in FIG. 9, the network element provided by this embodiment may include an identifying unit 91, a sending unit 92, and a processing unit 93. The identifying unit 91 is configured to identify a type of a received short message. The sending unit 92 is configured to send a query message to a second network element if the identifying unit 91 identifies that the type of the short message is a preset-type short message, where the query message includes an identifier of a receiver of the short message and an identifier of a sender of the short message, so that the second network element checks whether the sender is authorized to send the preset-type short message to the receiver. The processing unit 93 is configured to receive, after the sending unit 92 sends the query message, a response message sent by the second network element, where the response message includes a check result of the check, and execute or not execute, according to the check result in the response message, an operation of sending the short message; or configured to receive, after the sending unit 92 sends the query message, an acknowledgment message or a rejection message that is sent by the second network element according to a check result of the check, and execute, according to the acknowledgment message, an operation of sending the short message, or not execute, according to the rejection message, an operation of sending the short message.

The preset-type short message identified by the identifying unit 91 may include but is not limited to a trigger short message or a small data short message.

Figure 10:
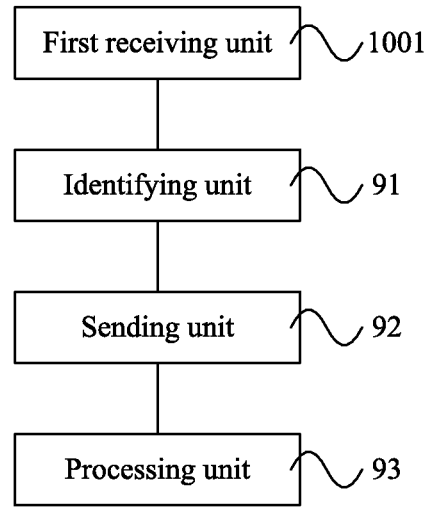
FIG. 10 is a schematic structural diagram of a network element according to another embodiment of the present invention.

Optionally, in an optional implementation manner of this embodiment, as shown in FIG. 10, the network element provided by this embodiment may further include a first receiving unit 1001 that is configured to receive the short message, where the short message includes preset-type information. Correspondingly, the identifying unit 91 may specifically identify, according to the preset-type information received by the first receiving unit 1001, that the type of the short message is the preset-type short message.

Figure 11:
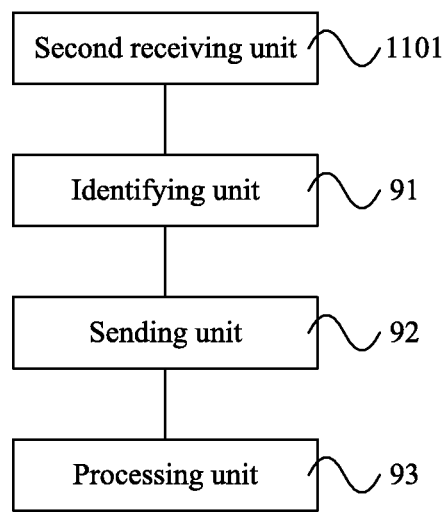
FIG. 11 is a schematic structural diagram of a network element according to another embodiment of the present invention.

Optionally, in an optional implementation manner of this embodiment, as shown in FIG. 11, the network element provided by this embodiment may further include a second receiving unit 1101 that is configured to receive the short message and a first preset-type indication, where the first preset-type indication is sent when a third network element finds that the type of the short message is the preset-type short message. Correspondingly, the identifying unit 91 may specifically identify, according to the first preset-type indication received by the second receiving unit 1101, that the type of the short message is the preset-type short message.

It can be understood that a method for the third network element to find that the type of the short message is the preset-type short message is similar to a method for the identifying unit 91 to identify that the type of the short message is the preset-type short message, and therefore no details are described herein again.

Optionally, in an optional implementation manner of this embodiment, the query message sent by the sending unit 92 may further include a second preset-type indication, so that the second network element checks, according to the second preset-type indication, whether the sender is authorized to send the preset-type short message to the receiver.

It can be understood that the second preset-type indication may be an indication that is the same as or different from the first preset-type indication. This embodiment poses no limitation thereon.

Optionally, in an optional implementation manner of this embodiment, the processing unit 93 may specifically configured to execute, according to the check result in the response message, the operation of sending the short message if the check result of the check is that the sender is authorized to send the preset-type short message to the receiver; and not execute, according to the check result in the response message, the operation of sending the short message if the check result of the check is that the sender is not authorized to send the preset-type short message to the receiver.

Optionally, in an optional implementation manner of this embodiment, the processing unit 93 may specifically configured to receive, if the check result of the check is that the sender is authorized to send the preset-type short message to the receiver, the acknowledgment message that is sent by the second network element according to the check result of the check; and receive, if the check result of the check is that the sender is not authorized to send the preset-type short message to the receiver, the rejection message that is sent by the second network element according to the check result of the check.

In this embodiment, a network element identifies a type of a received short message through an identifying unit, and if the identifying unit identifies that the type of the short message is a preset-type short message, the identifying unit may send a query message to a second network element, where the query message includes an identifier of a receiver of the short message and an identifier of a sender of the short message, so that the second network element checks whether the sender is authorized to send the preset-type short message to the receiver, it can be realized that only an authorized sender can send the preset-type short message to a corresponding receiver, and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

Figure 12:
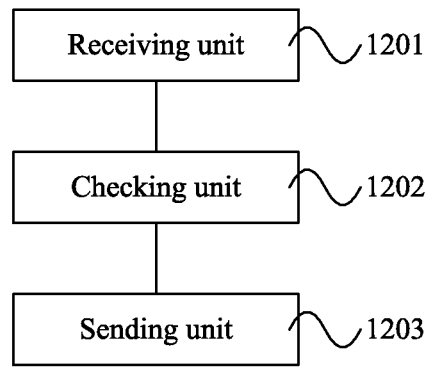
FIG. 12 is a schematic structural diagram of a network element according to another embodiment of the present invention.

FIG. 12 is a schematic structural diagram of a network element according to another embodiment of the present invention. As shown in FIG. 12, the network element provided by this embodiment may include a receiving unit 1201, a checking unit 1202, and a sending unit 1203. The receiving unit 1201 is configured to receive a query message sent by a first network element, where the query message is sent after the first network element identifies that a type of a received short message is a preset-type short message, and the query message includes an identifier of a receiver of the short message and an identifier of a sender of the short message. The checking unit 1202 is configured to check whether the sender of the short message in the query message received by the receiving unit 1201 is authorized to send the preset-type short message to the receiver of the short message. The sending unit 1203 is configured to send a response message to the first network element, where the response message includes a check result checked by the checking unit 1202, so that the first network element executes or does not execute, according to the check result in the response message, an operation of sending the short message; or send an acknowledgment message or a rejection message to the first network element according to a check result of the check, so that the first network element executes, according to the acknowledgment message, an operation of sending the short message or does not execute, according to the rejection message, an operation of sending the short message.

The preset-type short message may include but is not limited to a trigger short message or a small data short message.

Optionally, in an optional implementation manner of this embodiment, the query message received by the receiving unit 1201 may further include a preset-type indication. Correspondingly, the checking unit 1202 checks, according to the preset-type indication, whether the sender is authorized to send the preset-type short message to the receiver.

Optionally, in an optional implementation manner of this embodiment, the checking unit 1202 may specifically configured to check whether the identifier of the sender is in an authorization list of the receiver. For example, when the identifier of the sender is in the authorization list of the receiver, the check result of the checking unit 1202 is that the sender is authorized to send the preset-type short message to the receiver; and when the identifier of the sender is not in the authorization list of the receiver, the check result of the checking unit 1202 is that the sender is not authorized to send the preset-type short message to the receiver.

Optionally, in an optional implementation manner of this embodiment, the sending unit 1203 may specifically configured to send the response message directly to the first network element; or may also send the response message to the first network element through a fourth network element.

Optionally, in an optional implementation manner of this embodiment, the sending unit 1203 may specifically configured to send the acknowledgment message or the rejection message directly to the first network element according to the check result of the check; or may also send the acknowledgment message or the rejection message to the first network element through a fourth network element according to the check result of the check.

In this embodiment, a network element receives, through a receiving unit, a query message sent by a first network element, where the query message is sent after the first network element identifies that a type of a received short messages is a preset-type short message, and the query message includes an identifier of a receiver of the short message and an identifier of a sender of the short message, and further a checking unit checks whether the sender is authorized to send the preset-type short message to the receiver, so that it can be realized that only an authorized sender can send the preset-type short message to a corresponding receiver and a problem in the prior art that an attacker sends trigger information to an MTC device by camouflaging an SCS, controlling an SCS, or controlling a common terminal can be solved, thereby improving security of triggering the MTC device. In addition, the technical solution of the present invention is used to avoid sending, by an attacker, a false short message to the MTC device, so that the attacker can be prevented from initiating a trigger attack or an information attack, thereby effectively saving electricity consumption of the MTC device and network resources.

Another embodiment of the present invention further provides an MTC device communication system. The MTC device communication system may include the first network element provided by any one of the embodiments corresponding to FIG. 9 to FIG. 11 and the second network element provided by the embodiment corresponding to FIG. 12.

Figure 13:
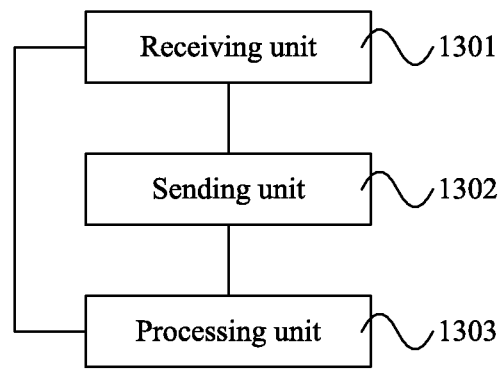
FIG. 13 is a schematic structural diagram of a network element according to another embodiment of the present invention.

FIG. 13 is a schematic structural diagram of a network element according to another embodiment of the present invention. As shown in FIG. 13, the network element provided by this embodiment may include a receiving unit 1301, a sending unit 1302, and a processing unit 1303. The receiving unit 1301 is configured to receive a trigger request, where the trigger request includes trigger information. The sending unit 1302 is configured to send a query message to a second network element, where the query message includes an identifier of a receiver of the trigger information, an identifier of a sender of the trigger information, and a trigger indication, so that the second network element checks, according to the trigger indication, whether the sender is authorized to send the trigger information to the receiver, where the trigger indication is generated by a first network element according to the trigger request. The processing unit 1303 is configured to receive, after the sending unit 1302 sends the query message, a response message sent by the second network element, where the response message includes a check result of the check, and execute or not execute, according to the check result in the response message, an operation of sending the trigger information; or configured to receive, after the sending unit 1302 sends the query message, an acknowledgment message or a rejection message that is sent by the second network element according to a check result of the check, and execute, according to the acknowledgment message, an operation of sending the trigger information, or not execute, according to the rejection message, an operation of sending the trigger information.

The trigger information may be trigger information that is used to trigger an MTC device to establish a communication connection with a network side and is included in the trigger request. For detailed descriptions, reference may be made to relevant content in the prior art, and details are not described herein again. The trigger information may also be small data that is used to transmit a small amount of data and is included in some messages.

Optionally, in an optional implementation manner of this embodiment, the processing unit 1303 may specifically configured to execute, according to the check result in the response message, the operation of sending the trigger information if the check result of the check is that the sender is authorized to send the trigger information to the receiver; and not execute, according to the check result in the response message, the operation of sending the trigger information if the check result of the check is that the sender is not authorized to send the trigger information to the receiver.

Optionally, in an optional implementation manner of this embodiment, the processing unit 1303 may specifically configured to receive, if the check result of the check is that the sender is authorized to send the trigger information to the receiver, the acknowledgment message that is sent by the second network element according to the check result of the check; and receive, if the check result of the check is that the sender is not authorized to send the trigger information to the receiver, the rejection message that is sent by the second network element according to the check result of the check.

In this embodiment, after a receiving unit of a network element receives a trigger request including trigger information, a query message is sent to a second network element through a sending unit, where the query message includes an identifier of a receiver of the trigger information, an identifier of a sender of the trigger information, and a trigger indication, so that the second network element checks, according to the trigger indication, whether the sender is authorized to send the trigger information to the receiver, it can be realized that only an authorized sender can send the trigger information to a corresponding receiver, and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Figure 14:
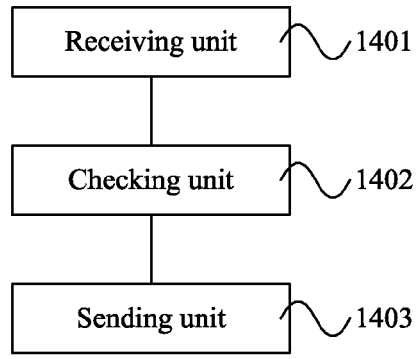
FIG. 14 is a schematic structural diagram of a network element according to another embodiment of the present invention.

FIG. 14 is a schematic structural diagram of a network element according to another embodiment of the present invention. As shown in FIG. 14, the network element provided by this embodiment may include a receiving unit 1401, a checking unit 1402, and a sending unit 1403. The receiving unit 1401 is configured to receive a query message sent by a first network element, where the query message is sent after the first network element receives a trigger request, the trigger request includes trigger information, and the query message includes an identifier of a receiver of the trigger information in the trigger request received by the first network element, an identifier of a sender of the trigger information, and a trigger indication. The checking unit 1402 is configured to check, according to the trigger indication, whether the sender is authorized to send the trigger information to the receiver. The sending unit 1403 is configured to send a response message to the first network element, where the response message includes a check result checked by the checking unit 1402, so that the first network element executes or does not execute, according to the check result in the response message, an operation of sending the trigger information; or send an acknowledgment message or a rejection message to the first network element according to a check result of the check, so that the first network element executes, according to the acknowledgment message, an operation of sending the short message or does not execute, according to the rejection message, an operation of sending the trigger information.

The trigger information may be trigger information that is used to trigger an MTC device to establish a communication connection with a network side and is included in the trigger request. For detailed descriptions, reference may be made to relevant content in the prior art, and details are not described herein again. The trigger information may also be small data that is used to transmit a small amount of data and is included in some messages.

Optionally, in an optional implementation manner of this embodiment, the checking unit 1402 may specifically configured to check whether the identifier of the sender is in an authorization list of the receiver. For example, when the identifier of the sender is in the authorization list of the receiver, the check result of the checking unit 1402 is that the sender is authorized to send the trigger information to the receiver; and when the identifier of the sender is not in the authorization list of the receiver, the check result of the checking unit 1402 is that the sender is not authorized to send the trigger information to the receiver.

In this embodiment, a network element receives, through a receiving unit, a query message sent by a first network element, where the query message is sent after the first network element receives a trigger request and the query message includes an identifier of a receiver of the trigger information, an identifier of a sender of the trigger information, and a trigger indication, and further a checking unit checks, according to the trigger indication, whether the sender is authorized to send the trigger information to the receiver, so that it can be realized that only an authorized sender can send the trigger information to a corresponding receiver and a problem in the prior art that an attacker sends the trigger information to an MTC device by camouflaging an SCS, controlling an SCS, or controlling a common terminal can be solved, thereby improving security of triggering the MTC device. In addition, the technical solution of the present invention is used to avoid sending, by an attacker, false trigger information to the MTC device, so that the attacker can be prevented from initiating a trigger attack or an information attack, thereby effectively saving electricity consumption of the MTC device and network resources.

Another embodiment of the present invention further provides an MTC device communication system. The MTC device communication system may include the first network element provided by the embodiment corresponding to FIG. 13 and the second network element provided by the embodiment corresponding to FIG. 14.

It may be clearly understood by a person skilled in the art that for the purpose of convenience and brief description, for detailed working processes of the foregoing system, apparatus, and unit, reference may be made to corresponding processes in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, division of the unit is merely logical function division and may be division in another manner in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A machine type communication (MTC) device communication method, comprising:
   receiving, by a first network element, a trigger request, the trigger request comprising trigger information;
   sending, by the first network element, a query message to a second network element, wherein the query message comprises an identifier of a receiver of the trigger information, an identifier of a sender of the trigger information, and a trigger indication, wherein the query message indicates checking, according to the trigger indication, whether the sender is authorized to send the trigger information to the receiver, wherein the trigger indication is determined by the first network element according to the trigger request, and wherein the first network element is an MTC Interworking Function (MTC-IWF) or a Short Message Service Gateway Mobile Switching Center (SMS-GMSC) and the second network element is a Home Location Register (HLR) or Home Subscriber Server (HSS); and
   receiving, by the first network element, a response message sent by the second network element, wherein the response message comprises a check result;
   determining whether to send the trigger information according to the check result in the response message;
   sending the trigger information in response to determining to send the trigger information according to the check result in the response message; and
   not sending the trigger information in response to determining not to send the trigger information according to the check result in the response message.

2. The method according to claim 1, wherein:
   determining whether to send the trigger information according to the check result in the response message comprises:
   determining to send the trigger information in response to the check result of the check is that the sender is authorized to send the trigger information to the receiver; and/or
   determining not to send the trigger information in response to the check result of the check is that the sender is not authorized to send the trigger information to the receiver.

3. A machine type communication (MTC) device communication method, comprising:
   receiving, by a second network element, a query message sent by a first network element, wherein the query message comprises an identifier of a receiver of trigger information, an identifier of a sender of the trigger information, and a trigger indication, and wherein the first network element is an MTC Interworking Function (MTC-IWF) or a Short Message Service Gateway Mobile Switching Center (SMS-GMSC) and the second network element is a Home Location Register (HLR) or Home Subscriber Server (HSS);
   checking, by the second network element, according to the trigger indication, whether the sender is authorized to send the trigger information to the receiver; and
   sending, by the second network element, a response message to the first network element, wherein the response message comprises a check result of the check, wherein the check result is indicates the first network element sending or not sending the trigger information.

4. The method according to claim 3, wherein the checking, by the second network element, according to the trigger indication, whether the sender is authorized to send the trigger information to the receiver, comprises:
   checking, by the second network element according to the trigger indication, whether the identifier of the sender is in an authorization list of the receiver.

5. A first network element, comprising:
   a processor;
   a receiver, configured to receive a trigger request, wherein the trigger request comprises trigger information; and
   a transmitter, configured to send a query message to a second network element, wherein the query message comprises an identifier of a receiver of the trigger information, an identifier of a sender of the trigger information, and a trigger indication, wherein the query message indicates checking, according to the trigger indication, whether the sender is authorized to send the trigger information to the receiver, wherein the trigger indication is determined by the first network element according to the trigger request, and wherein the second network element is a Home Location Register (HLR) or Home Subscriber Server (HSS);

wherein the receiver is further configured to receive a response message sent by the second network element, wherein the response message comprises a check result;

wherein the processor is configured to:
  determine whether to send the trigger information by the transmitter according to the check result in the response message;
  in response to the processor determining to send the trigger information, the processor is configured to send the trigger information by the transmitter; and
  in response to the processor determining not to send the trigger information, not sending the trigger information; and wherein the first network element is a MTC Interworking Function (MTC-IWF) or a Short Message Service Gateway Mobile Switching Center (SMS-GMSC).

6. The first network element according to claim 5, wherein the transmitter is further configured to:
  transmit the trigger information, according to the check result in the response message, in response to the check result being that the sender is authorized to send the trigger information to the receiver; and
  not transmit the trigger information in response to the check result of the check being that the sender is not authorized to send the trigger information to the receiver.

7. The first network element according to claim 5, wherein the receiver is further configured to:
  receive, in response to the check result being that the sender is authorized to send the trigger information to the receiver, the response message that is sent by the second network element according to the check result, the response message being an acknowledgment message; and
  receive, in response to the check result being that the sender is not authorized to send the trigger information to the receiver, the response message that is sent by the second network element according to the check result, the response message being a rejection message.

8. A second network element comprising:
  a receiver, configured to receive a query message sent by a first network element, wherein the query message is sent after the receiver receives a trigger request, wherein the trigger request comprises trigger information, wherein the query message comprises an identifier of a receiver of the trigger information, an identifier of a sender of the trigger information, and a trigger indication, and wherein the first network element is a MTC Interworking Function (MTC-IWF) or a Short Message Service Gateway Mobile Switching Center (SMS-GMSC);
  a processor, configured to check, according to the trigger indication received by the receiver, whether the sender of the trigger information received by the receiver is authorized to send the trigger information to the receiver of the trigger information; and
  a transmitter, configured to send a response message to the first network element, wherein the response message comprises a check result, wherein the check result indicates whether the first network element should send the trigger information;
  wherein the second network element is a Home Location Register (HLR) or Home Subscriber Server (HSS).

9. The second network element according to claim 8, wherein the processor is further configured to:
  check, according to the trigger indication, whether the identifier of the sender is in an authorization list of the receiver.

* * * * *